P. NITZSCHE.
SLIDING CATCH LOCK.
APPLICATION FILED DEC. 15, 1910.

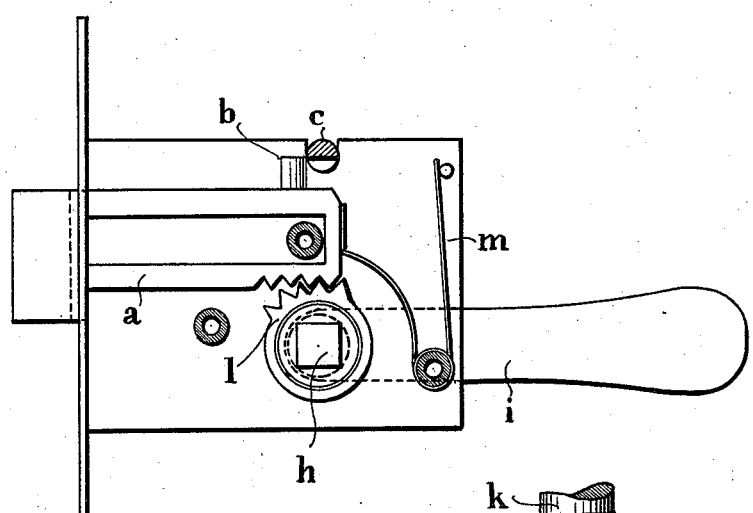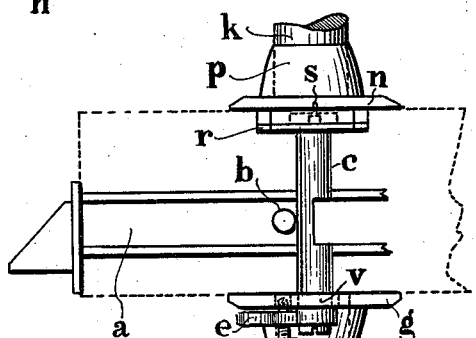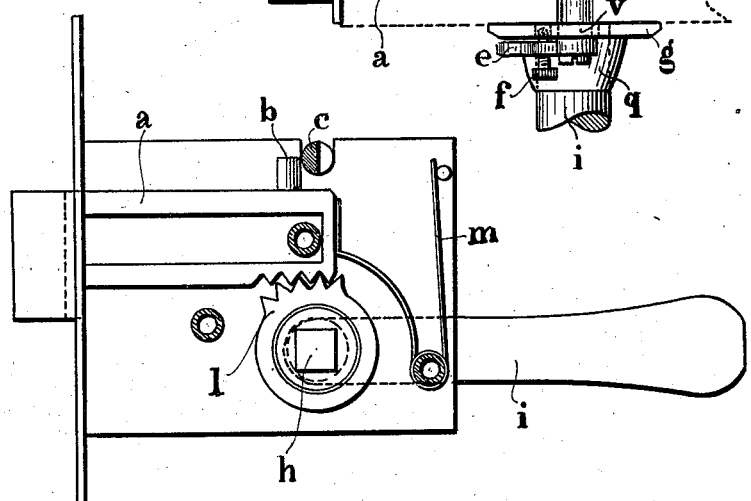

1,001,217.

Patented Aug. 22, 1911.

2 SHEETS—SHEET 2.

Fritz Hennemann
Karl Varrelmann

Paul Nitzsche.

UNITED STATES PATENT OFFICE.

PAUL NITZSCHE, OF BANT, GERMANY.

SLIDING-CATCH LOCK.

1,001,217. Specification of Letters Patent. Patented Aug. 22, 1911.

Application filed December 15, 1910. Serial No. 597,483.

*To all whom it may concern:*

Be it known that I, PAUL NITZSCHE, master locksmith, a subject of the German Emperor, residing at No. 23 Mitscherlich street, town of Bant, Germany, in the Grand Dukedom of Oldenburg, have invented certain new and useful Improvements in Sliding-Catch Locks, of which the following is a specification, reference being had therein to the accompanying drawings.

The invention relates to a sliding-catch lock with means for fixing the catch and the operating nut or pinion, and consists in the arrangement in connection with the catch bolt of a turning bolt which is partially cut away and prevents the catch-bolt from moving backward when adjusted in a certain position, and can only be turned from outside by means of a particular key. The catch bolt is thus secured by means of the turning bolt. A second means of securing the turning bolt is arranged, as the operating lever can also be fixed in the locking position by means of a screw.

Figure 4:
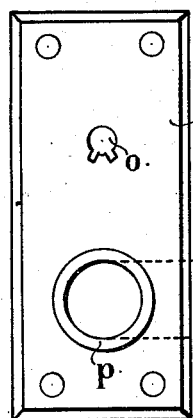
Figure 4A:
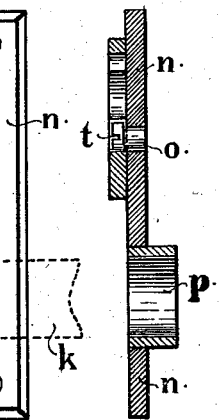
Figure 4B:
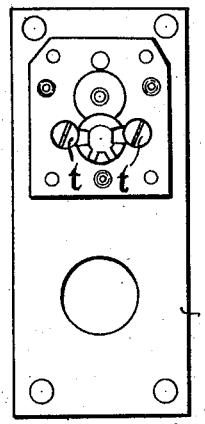
Figure 5:
Figure 5A:
Figure 6:
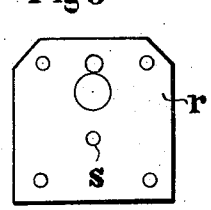
Figure 6A:
Figure 7:
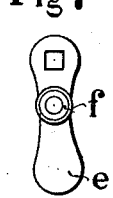
Figure 7A:
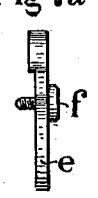
Figure 8:
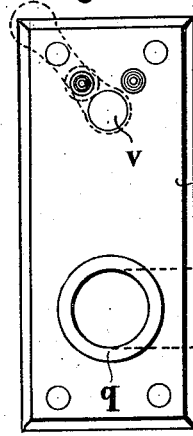
Figure 8A:
Figures 9, 9A:
Figures 9B, 9C:
Figures 10, 10A, 10B:
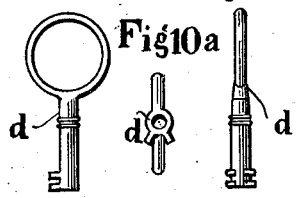

Figure 1 of the drawing is a central vertical section of the new sliding-catch lock in the open position. Fig. 2 is a view of the lock from above in the locking position. Fig. 3 is a central vertical section of the lock in the locking position. Fig. 4 is a front elevation of the lock-plate situated on the outside of the door. Fig. 4$^a$ is a central longitudinal section thereof. Fig. 4$^b$ is a back view of the same plate. Figs. 5 and 5$^a$ are respectively a front elevation and a side elevation of a fixing or adjusting device fixed in the lock by means of a screw. Figs. 6 and 6$^a$ illustrate a liner plate of the lock. In Figs. 7 and 7$^a$ the locking lever arranged on the inside of the door is shown respectively in front elevation and in side elevation. Figs. 8 and 8$^a$ illustrate the lock plate situated on the inside of the door in front elevation and side elevation respectively. Figs. 9, 9$^a$, 9$^b$, and 9$^c$ are respectively a front elevation, a side elevation and two end views of the locking bolt belonging to the lock. Figs. 10, 10$^a$ and 10$^b$ illustrate in front elevation and side elevation, an example of a key suited to the lock.

In the example of the invention illustrated in the drawing $a$ is the catch-bolt $b$ a pin thereon, which when in the locking position (Fig. 3,) prevents the catch bolt $a$ from moving below the turning bolt $c$ arranged above, but when in the open position (Fig. 1) allows the catch bolt to move back and forth. For this purpose the turning bolt $c$ is cut away in the place where the pin $b$ is intended to slide past same. The turning bolt $c$ can be turned from the outside by means of the key $d$. The turning bolt $c$ can be turned from the inside of the door by means of the lever $e$. The latter can be fixed in the locking position (Fig. 3) by screwing up the pointed binding screw $f$, so that it engages in a hole provided for the purpose in the lock plate $g$ and makes it impossible for the lever $e$ to turn. The shaft $h$ of the two door handles $i$ and $k$ carries the nut or pinion $l$ which engages in teeth on the catch bolt $a$. The spring $m$ has a tendency to press the catch bolt into the locking position. The key $d$ may have one or more wards. In the lock plate $n$ (Fig. 4) seated on the outside of the door is an opening $o$ for the introduction of a key with two wards. The openings for the handle shaft $h$ are surrounded on both door plates $n$ and $g$ by bearing supports $p$ and $q$. On a special insertion plate $r$ that carries the pin $s$ for the key $d$, a pair of fixing or adjusting devices $t$ are fixed by means of screws, which can be easily adjusted as desired in their oblong slots $u$, so that the lock can no longer be locked with the old keys $d$ but only with a suitably formed new key. The turning bolt $c$ extends through the hole $v$ in the inside door-plate and carries on its square end the locking lever $e$ (Figs. 7 and 8) which enables the locking bolt $c$ to be turned in the hole and to be fixed in certain positions by means of the screw $f$.

What I claim as my invention and desire to secure by Letters Patent, is:—

In combination with a sliding bolt, a vertical pin extending upwardly therefrom, a rotatable bolt disposed transverse to said sliding bolt and formed with a cutaway part which when in one position permits the pin to travel past the rotatable bolt and which when the bolt is rotated to another position prevents movement of the sliding bolt.

In testimony whereof I affix my signature in presence of two witnesses.

PAUL NITZSCHE.

Witnesses:
FRITZ RAMERMANN,
KARL VARRELMANN.

Copies of this patent may be obtained for five cents each, by addressing the "Commissioner of Patents, Washington, D. C."